United States Patent Office 3,192,190
Patented June 29, 1965

3,192,190
OCTAFLUOROVINYLPHENYL ETHER AND ITS POLYMERS
Leo A. Wall, Washington, D.C., and Walter J. Pummer, Rockville, Md., assignors to the United States of America as represented by the Secretary of the Navy
No Drawing. Filed July 31, 1962, Ser. No. 213,832
8 Claims. (Cl. 260—91.1)
(Granted under Title 35, U.S. Code (1952), sec. 266)

The invention described herein may be manufactured and used by or for the Government of the United States of America for governmental purposes without the payment of any royalties thereon or therefor.

The present invention relates to a novel fluorinated ether and a method of preparation thereof. In another aspect this invention relates to new and useful fluorine-containing polymer compositions ranging from relatively low molecular weight liquid polymers to high molecular weight solid polymers including greases, waxes, resins, elastomers.

Fluorine-containing polymers ranging from low molecular weight oils to high molecular weight plastics are of outstanding industrial importance due to their marked high thermal and chemical resistance. With the advent of missiles and rockets there has arisen a critical need for materials capable of withstanding temperatures of over 1000° F. at pressure above 1800 p.s.i. in highly oxidative atmospheres. The fluorine-containing polymers of the prior art have been found not satisfactory for these requirements.

Accordingly it is an object of the present invention to provide a particular, novel and useful fluorine-containing monomer and polymer thereof.

Another object is to provide a new and useful fluorine-containing ether and to provide a process for the manufacture thereof.

Yet another object of this invention is to provide new and useful fluorine-containing polymers having excellent thermal and oxidative resistance.

Various other objects and many of the attendant advantages of this invention will be readily appreciated as the same becomes better understood by reference to the following detailed description and disclosure.

The above recited objects are accomplished by the preparation of octafluorovinylphenyl ether, a perfluoro ether of the formula $C_6F_5$—O—CF=$CF_2$; and the polymerization thereof to a polymer having the above-described desirable properties.

The octafluorovinylphenyl ether is prepared directly by reaction of tetrafluoroethylene (TFE) with an alkali metal salt of a pentafluorophenoxide in the presence of solvents. The alkali metal salt of the pentafluorophenoxide utilized may be those available commercial such as the sodium, potassium or lithium salts, either hydrated or dehydrated, or it may be prepared in situ in the presence of solvent by reacting pentafluorophenol with a dispersion of the alkali metal. However, great care should be taken that no hydroxyl hydrogen or other available hydrogen remains in the reaction system (e.g., no free alcohol) when the tetrafluoroethylene is added, otherwise, the saturated ether, nonafluoroethylphenyl ether, will be formed. For this same reason, any moisture, protonic solvent, or a solvent which could react with the original base or any intermediate base that is formed should not be present because of this tendency to form the saturated ether. Another byproduct that can be formed during this reaction is 1,2-dipentafluorophenoxy-1,2-difluoroethylene. This latter product is presumably arise from further addition to the alkali metal pentafluorophenoxide to the octafluorovinylphenyl ether. The reaction would then proceed according to the following equation:

$C_6F_5OM + CF_2=CF_2 \rightarrow C_6F_5$—O—CF=$CF_2$ +
$C_6F_5$=O—$CF_2$—$CF_2H$ +
$C_6F_5O$—CF=CF—O—$C_6F_5$ +
High Products + MF.

The exact conditions of the reaction depend upon the alkali metal salt of the pentafluorophenoxy compound employed as well as the solvent used. Various solvents were investigated. It was attempted in Example 1 of Table I to obtain the olefin by the reaction of potassium pentafluorophenoxide hydrate with TFE in dimethyl formamide at 80° C. but only the saturated ether was formed. In Example 2 the hydrated lithium salt was utilized but it behaved in a similar manner except that the yields were somewhat lower. Reaction was attempted in ethyl ether, benzene or toluene at these temperatures and pressures but was not successful. However, under anhdyrous conditions at higher pressures and temperatures and in the presence of a mixture of solvents, the alkali metal pentafluorophenoxide and TFE reacted to form the desired octafluorovinylphenyl ether (Examples 3 to 4).

TABLE I

Reaction of pentafluorophenol salts with tetrafluoroethylene (TFE)

| Examples | $C_6F_5OM$ (g.) | Metal | TFE(g.) | Solvent(s) in cc. |
|---|---|---|---|---|
| 1 | 18 | K | 30 | DMF (40). |
| 2 | 17 | Li | 30 | DMF (40). |
| 3 | a18 | Na | 25 | Benzene(100, THF(34). |
| 4 | a135 | K | 80 | Benzene(350), THF(100). |

| Examples | Temp. (°C.) | Pre. (p.s.i.) | Yield | Product(s) |
|---|---|---|---|---|
| 1 | 75 | 135 | 83.8 | $C_6F_5$-O-$CF_2$-$CF_2H$. |
| 2 | 80 | 149 | 64.1 | $C_6F_5$-O-$CF_2$-$CF_2H$. |
| 3 | 190 | 500 | 64.2 | $C_6F_5$-O-$CF_2$-$CF_2H$. |
|  |  |  | 4.3 | $C_6F_5$-O-CF=$CF_2$. |
|  |  |  | 6.8 | $C_6F_5$-O-CF=$CF_2$. |
| 4 | 190 | 350 | 3.0 | $C_6F_5$-O-$CF_2$-$CF_2H$. |
|  |  |  | 19.5 | $C_6F_5$-O-CF=CF-O$C_6F_5$. | a Anhydrous conditions.

The first group of solvents comprise ethyl ether, benzene and toluene, and the second group includes tetrahydrofuran, dioxane and dimethylformamide. These solvent pairs apparently permit sufficient amounts of the fluorophenoxide salts to be dissolved in a given time to allow the reaction to proceed but do not release such a quantity of the fluorophenol ion to continue the reaction to the difluorophenoxy and other higher condensation products. The ratio of solvents is not critical and can be varied over a wide range. However, it is preferable to maintain an excess of benzene, ethyl ether or toluene so that higher yields of the olefin can be obtained.

The ratio of the other reactants can be varied over a wide range also. It is preferable to maintain an excess of the tetrafluoroethylene so that the competition between the olefin to form the dipentafluorophenoxy compound and the basic compound to form the olefin will be influenced in favor of the latter reaction. The formation of the saturated ether, nonafluoroethylphenyl ether, probably arises from incomplete dehydration of the solvents or phenol salt or possibly the intermediate anion formed may abstract a proton from one of the solvent molecules according to the following reaction:

$C_6F_5$—O—$CF_2$—$CF_2^-$ + H$^+$ Solvent$^-$ →
$C_6F_5$—O—$CF_2$—$CF_2H$ +$^-$ Solvent In this regard the potassium pentafluorophenoxide salts seem to be easier to dehydrate by azeotropic distillation than either the sodium or potassium salt.

The reactions to prepare the olefin were performed in silver-lined Parr bombs of 188 ml., 800 ml., or 1400 ml. capacity under autogenous pressure. The anhydrous pentafluorophenoxide salt or hydrate and solvents were placed in the bomb under an atmosphere of dry nitrogen prior to sealing. The bomb was evacuated but not degassed. Tetrafluoroethylene was then condensed into the bomb, which had been precooled in liquid nitrogen and the bomb was then sealed and placed in the rocker mechanism. The temperature at which the pressure decreased was taken as the reaction temperature. The pentafluorophenolic salts were dried by azeotropic distillation from benzene followed by toluene, and finally by removal of the solvent in vacuo. The reaction solvents were dried by distillation from the following reagents; benzene (sodium); dimethylformamide ($P_2O_5$); dioxane (sodium); tetrahydrofuran ($LiAlH_4$) and ethyl ether (sodium).

At the completion of the reaction, excess tetrafluoroethylene was bled from the bomb, the contents were then poured into a suitable distilling container and the solvents and products were removed from the salt in vacuo. The residual salts were washed several times with benzene to remove any organic matter and the washing combined with the main solution. Acidification of the salts led to the recovery of any unreacted phenol. The solvents were removed from the products by distillation at atmospheric pressure. The products were also concentrated by distillation before the separation steps.

Distillation of a mixture of the octafluorovinylphenyl ether and the nonafluoroethylphenyl ether gave inadequate separation. However, complete separation was effected by preparative vapor phase chromatography at 100° C. using a column packing composed of 20% Viton A on 80–100 mesh celite. Viton A is an adsorbent packing manufactured by the E. I. du Pont Corporation comprising a copolymer of hexafluoropropene and vinylidene fluoride. The octafluoroethylphenyl ether was eluted first. A pure sample was obtained by passing the eluted sample several times through this column. Confirmation of the fluorinated vinyl ether was obtained by mass spectrometer analysis.

Further confirmation of the olefinic structure of the ether was obtained by infra-red spectroscopy. The infra-red spectra showed the olefinic band of octafluorovinylphenyl ether at 1831 cm.$^{-1}$. This band is absent in the saturated nonafluoroethylphenyl ether. Other physical constants of the products are:

TABLE II

| | Octofluorovinylphenyl ether | Nonafluoroethylphenyl ether |
| --- | --- | --- |
| Boiling point, ° C | 127–128 | 127–128 |
| Refractive index ($n_D^{20}$) | 1.3862 | 1.3701 |

The octafluorovinylphenyl ether appears to be thermally stable up to 230° C. It can be distilled at atmospheric pressure without any tendency to polymerize, even without inhibitors. A sample of this olefin was sealed in a glass ampule and maintained at 230° C. for ten days. There appeared to be only a slight reaction with the glass walls, but no indication of polymerization. Irradiation with ultraviolet light in the absence of catalyst at room temperature fails to produce any polymer. However, at 130° C. in strong ultraviolet light, the material darkens and becomes viscous.

A more successful polymerization of the fluorovinyl ether was obtained by gamma irradiation of the monomer in benzene at 100° C. and at high pressure. The speed of the reaction is a function of the dosage. Suitable reaction rates have been effected at dosages from 0.01 to 1 megarads per hour from a cobalt-60 source. The pressure of the polymerization reaction is not critical and can be varied anywhere between 5 to 5000 atmospheres. The temperature of the polymerization reaction can be varied anywhere from 20° C. to 200° C., 100° C. being preferred. The monomer can be dissolved in any suitable solvent such as benzene, diethyl ether, THF, DMF, etc., which may or may not be a solvent for the polymer.

The polymer obtained is tacky and has a glass transition point around room temperature. It can be dissolved in hexafluorobenzene and reprecipitated with perfluoroheptene. The polymer is white. Tests show this polymer to have excellent thermal stability at elevated temperatures.

It should be understood that the operating conditions may be varied widely depending upon the nature of the reactants, the solvents, the proportions used and upon the results desired. The time required for carrying out the reactions may vary from several minutes to a few days, also depending on the nature and concentration of the reactants and other process conditions such as temperature, pressure and catalytic initiator.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. A process for the preparation of octafluorovinylphenyl ether which comprises the steps of reacting tetrafluoroethylene with an alkali metal pentafluorophenoxide in an inert, anhydrous mixture of nonpolar and polar solvents, the nonpolar solvent being in excess, at a temperature of at least 190° centigrade and separating from the reaction product, octafluorovinylphenyl ether.

2. The process according to claim 1 wherein tetrafluoroethylene is present in an amount in excess of the alkali metal pentafluorophenoxide.

3. The process according to claim 1 wherein the alkali metal pentafluorophenoxide is formed in situ.

4. The process according to claim 1 wherein the constituents of the mixture of solvents are chosen one from a first group of nonpolar solvents consisting of benzene, toluene and diethyl ether and the other from a group of polar solvents consisting of tetrahydrofuran, dioxane and dimethylformamide.

5. The compound octafluorovinylphenyl ether.

6. The process of polymerizing octafluorovinylphenyl ether comprising the steps of subjecting said olefin to actinic radiation under suitable conditions of temperature and high pressure and separating the resultant polymer.

7. The polymer produced by the process of claim 6.

8. The polymer, polyoctafluorovinylphenyl ether.

References Cited by the Examiner

UNITED STATES PATENTS

| 2,799,712 | 7/57 | Croix et al. | 260—91.1 |
| 2,917,548 | 12/59 | Dixon | 260—614 |
| 2,928,870 | 3/60 | Hasek | 260—91.1 |

OTHER REFERENCES

Atkinson, J. Chem. Soc., 2684 (1952).

JOSEPH L. SCHOFER, *Primary Examiner.*

N. B. TORCHIN, *Examiner.*